(12) United States Patent
Chaffin et al.

(10) Patent No.: US 6,225,412 B1
(45) Date of Patent: May 1, 2001

(54) PLASTIC TOUGHENED PLASTICS

(75) Inventors: Kimberly A. Chaffin, Plymouth; Frank S. Bates, St. Louis Park, both of MN (US); Patrick Brant, Seabrook, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 0 days.

(21) Appl. No.: 09/374,031

(22) Filed: Aug. 13, 1999

Related U.S. Application Data

(60) Provisional application No. 60/097,123, filed on Aug. 19, 1998.

(51) Int. Cl.$^7$ .............................. C08L 23/00; C08L 23/04
(52) U.S. Cl. .............................................................. 525/240
(58) Field of Search ............................................... 525/240

(56) References Cited

U.S. PATENT DOCUMENTS

| | | | |
|---|---|---|---|
| 5,576,374 | 11/1996 | Betso et al. | 524/451 |
| 5,712,344 | 1/1998 | McCullough, Jr. et al. | 525/88 |

FOREIGN PATENT DOCUMENTS

| | | |
|---|---|---|
| 0490353 | 6/1992 | (EP) . |
| 07330828 | 12/1995 | (JP) . |
| 8-067783 | 3/1996 | (JP) . |
| 8-269264 | 10/1996 | (JP) . |
| 9-031264 | 2/1997 | (JP) . |
| 9-255821 | 9/1997 | (JP) . |
| WO 93/06169 | 4/1993 | (WO) . |
| WO 94/06859 | 3/1994 | (WO) . |
| WO 95/32089 | 11/1995 | (WO) . |
| WO 98/21275 | 5/1998 | (WO) . |

OTHER PUBLICATIONS

T.C. Yu, *Impact Modification of Polypropylenes with Exact Plastomers*, Society of Plastics Engineers, 52$^{nd}$ Annual Technical Conference, May, 1994, 1–8, Exxon Chemical Company, San Francisco, California, USA.

*Primary Examiner*—Nathan M. Nutter
(74) *Attorney, Agent, or Firm*—William G. Muller; Charles E. Runyan

(57) ABSTRACT

Plastics toughened plastics are metallocene catalyzed polyethylenes (mPE) and isotactic polypropylene (iPP). These plastic toughened plastics are useful in molded articles, most especially automotive interior trim parts. The mPE can be present in such toughened plastics from 5–40 weight percent, the iPP from 60–95 weight percent. The toughened plastics will have an excellent balance of tensile toughness, elongation and modulus at −10° C. Generally the tensile toughness will be 25–250% greater than the tensile toughness of a similarly proportioned blend of Ziegler-Natta catalyst produced polyethylene/iPP.

12 Claims, 3 Drawing Sheets

PLASTIC TOUGHENED PLASTICS

RELATED APPLICATIONS

This applicaiton is related to U.S. Ser. No. 60/097,123 filed Aug. 19, 1998.

TECHNICAL FIELD

This invention relates generally to polyolefin plastics toughened by other polyolefin plastics. More specifically this invention is directed toward polypropylenes toughened with polyethylenes.

BACKGROUND

Polypropylene is a versatile and widely used thermoplastic. Many of its uses are in applications that take advantage of its excellent physical properties in molded shapes. However, while polypropylene has outstanding stiffness, it fails in a brittle mode on impact, especially at subambient temperatures. Because many applications that could take advantage of the excellent stiffness also require a tougher material, one that will fail in either brittle or brittle ductile mode, softer, more amorphous polymers have traditionally been added to polypropylene to improve polypropylene impact resistance and tensile toughness. Applications such as this include interior trim parts of vehicles, such as trucks and passenger automobiles.

To mitigate the brittle nature of polypropylene, as discussed above, softer, more amorphous polymers are often added to polypropylene, these materials have traditionally included EPR and EPDM. These ethylene α-olefin co or terpolymers are most often ethylene propylene rubbers or ethylene propylene diene monomer rubber (EP or EPDM respectively). These materials are generally characterized by a heat of melting generally below 30 J/g, although ethylene α-olefin copolymers including higher α-olefins such as butene, hexene, octene and the like have been also been used, these materials have low crystallinity, and high extractability, and are generally in the density range 0.86 to 0.900 g/cm3 while conventional EPR or EPDM materials have densities in the range generally at or below 0.86 g/cm3.

More recently, other soft materials have been added to impact modify polypropylene, such as ethylene butene copolymers. In the publication Impact Modification of Polypropylene with Exact™ Plastomers, Society of Plastics Engineers, 1994, the author describes advantageous use of such ethylene butene polymers, with an upper density limit of 0.910 g/cm3. Of note in the data presented in this publication is that stiffness or modulus decreases fairly rapidly with increasing plastomer content. Fabricators of automotive parts often desire to have a stiff part, as well as one that is tough, as exemplified by tensile toughness. Soft or elastomeric or amorphous polymers inevitably tend to soften, or make less rigid, the polypropylene polymers that they make tougher. These softer polymers are often characterized by being totally or substantially extractable or soluble in specific solvents. An additional drawback of isotactic polypropylene/ethylene propylene polymers (iPP/EP) or iPP/EPDM blends is cost. EP or EPDM costs considerably more than polypropylene, raising the cost of the blend.

Therefore, there is an unfilled commercial need for a blend constituent with polypropylene that will maintain or improve tensile toughness especially at low temperature or even enhance the low temperature tensile toughness, while minimizing or eliminating the negative effect on stiffness, as measured by modulus.

SUMMARY

We have discovered that semicrystalline polyethylenes, specifically metallocene catalyst produced polyethylenes (mPE), generally above 0.910 in density and below 3% extractables, as determined by 21 CFR 177.1520 (d) (4) (i) (xylene), when blended with isotactic polypropylene (iPP), offer plastic toughened plastics with a surprising and unexpected balance of stiffness (as measured by modulus) and tensile toughness, both at low ambient temperatures. Traditional approaches to improving tensile toughness, such as adding blend components EP rubber, EPDM rubber, or plastomers to iPP, have improved tensile toughness, but dramatically diminished the stiffness or modulus, to an unacceptable level for many applications. Additionally, the blends of embodiments of our invention show surprising and unexpected improvements (increases) in elongation as well as the tensile toughness and modulus discussed above, as compared to Ziegler-Natta PE/iPP (Z-N PE/iPP) blends, based on what the skilled person would expect. Such a balance of desirable properties has been heretofore unattainable, and is unexpected.

As an isotactic polypropylene (iPP), most currently available iPP will be useable. Those iPPs with a relatively high Melt Flow Rate (MFR) (e.g. 1–200 dg/min) will be preferred. The iPP will be present in the blend in the range of 60–95 weight percent based on the total weight of the blend components. While Ziegler-Natta catalyst produced Z-N iPP may be used, metallocene produced iPP will have an even lower amount of amorphous or extractable material, and when blended with a mPE of low extractables, offers even better physical properties than Z-N iPP in the blends.

As an mPE, those with densities in the range of from 0.910–0.930 g/cm$^3$ are preferred, more preferred are densities of 0.912–0.930 g/cm$^3$, even more preferred are those in the range of from 0.915–0.925 g/cm$^3$, most preferred are densities in the range of from 0.915–0.920 g/cm$^3$. Additionally, these mPEs will have a molecular weight distribution (MWD) as described by Mw/Mn of $\leq 4$, a composition distribution breadth index (CDBI) of 55–90%; a crystallinity of about 40%, as may be additionally expressed by heat of melting of at least 85 J/g. These mPEs will also have substantially lower extractables than their Z-N PE analogs, especially their gas phase produced Z-N PE analogs. The mPE will be present in the blends in the range of 5–40 weight percent based on the total weight of the blend components.

Tensile toughness of these iPP/mPE blends at −10° C., as measured in MJ/m$^2$, will be at least 25% greater, preferably at least 100% greater, more preferably at least 200% greater, most preferably 250% greater, than similarly proportioned iPP/Ziegler-Natta PE blends. Similarly the elongation of iPP/mPE blends will be 10% greater, preferably 20% greater, more preferably 30% greater, most preferably 40% greater than that of a similar iPP/Z-N PE blend. These improvements are realized while generally not substantially degrading the modulus or stiffness of the blends, as compared to similarly proportioned Z-N PE/iPP blends.

While not wishing to be bound by theory, we believe that these unexpected and surprising properties are due to the lower extractables levels of the blends containing one or more metallocene catalyst produced polymers. The extractables levels of the inventive iPP/mPE blends will be less than 2%, preferably less than 1.5%, more preferably less than 1%, even more preferably less than 0.75%, most preferably less than 0.5%, as measured by 21 CFR 177.1520 (d) (4) (i) (in xylene). The CDBI of a polymer is determined using the technique temperature rising elution fractionation (TREF) for isolating individual fractions of a sample of a copolymer. The technique is described in Wild, et al., *J. Poly. Sci. Phys. Ed.* vol. 20, p 441 (1992) and U.S. Pat. No. 5,008,204, both incorporated herein by reference.

DESCRIPTION OF THE DRAWINGS

These and other aspects, features and advantages of the present invention will become better understood with regard to the following description, appended claims and accompanying drawings, where:

DETAILED DESCRIPTION

Figure 1:
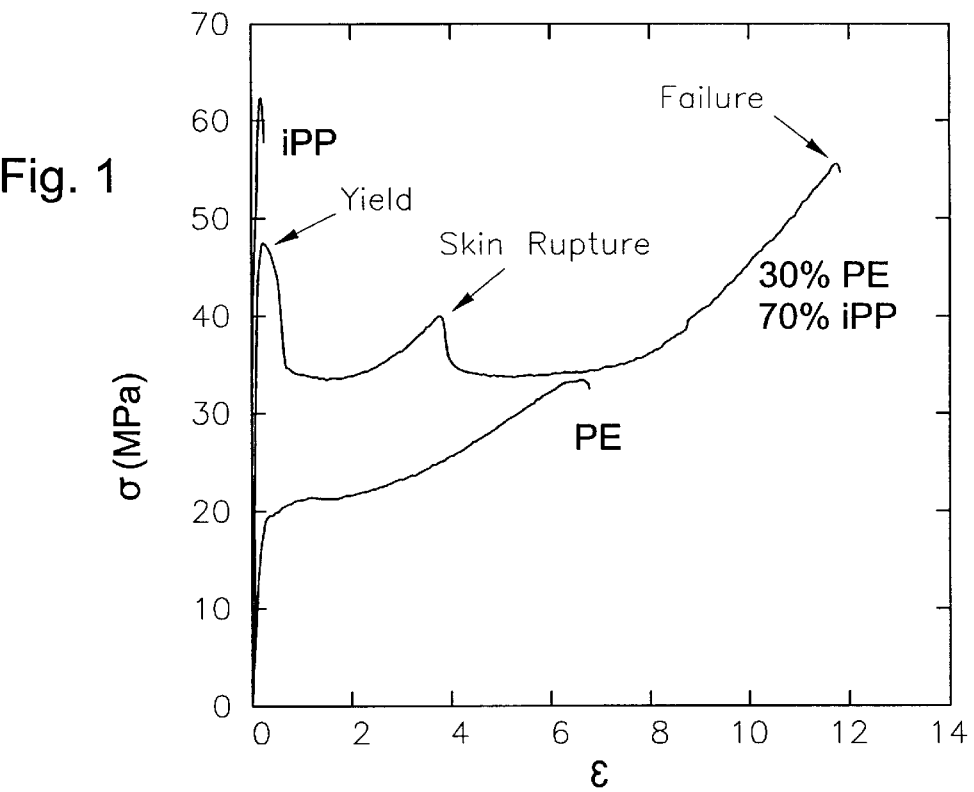
FIG. 1 is a stress-strain relationship for blends and the individual components.

In certain embodiments of our invention, plastic toughened plastics including an iPP and an mPE are contemplated. The plastic toughened plastics will generally be blends. Theses plastic toughened plastics will exhibit a superior balance of tensile toughness and stiffness as well as enhanced elongation, as compared to a similar blend of iPP and Ziegler-Natta catalyzed PE.

The combination of iPP and mPE will be especially useful in molded parts, more particularly molded automotive interior trim parts.

Following is a detailed description of certain preferred combinations of iPP and mPE, their fabrication into useful articles and use of these articles. Those skilled in the art will appreciate that numerous modifications to these preferred embodiments may be made without departing from the scope of our invention. For example, while certain specific blends of iPP and mPE are exemplified, other blends are also contemplated. Additionally, while automotive interior trim parts are discussed as uses for the inventive blends, other uses are also contemplated.

To the extent that this description is specific, it is solely for the purpose of illustrating certain preferred embodiments of the invention and should not be taken as limiting the present inventive concepts to these specific embodiments.

The tensile toughness as well as elongation will also be improved by the above referenced blends at low temperature, e.g. $-10°$ C., and the modulus maintained in an acceptable level.

Unblended iPP changes failure modes as the temperature drops. At or near room temperature ($23°$ C.) iPP fails in what is known as a crazing failure mode. This mode is highly energy absorbing. At low temperatures ($\leq 0°$ C.), the failure mode changes to brittle failure mode.

By contrast, polyethylenes exhibit a ductile-to-brittle transition failure mode at a temperature that is well below that of iPP, resulting in ductile failure at most subambient temperatures.

Isotactic Polypropylene

Isotactic polypropylene contemplated in embodiments of our invention include those iPPs made using either Ziegler-Natta or metallocene catalysts, or combinations thereof. While generally contemplating homo isotactic polypropylene, random and impact copolymer polypropylenes are also contemplated with an ethylene, α-olefin or diolefin content up to about 10% (wt.).

MFRs of the iPP may range from 0.1 to 1000 preferably 1 to 500, more preferably 10–250 most preferably 10–150 dg/min. The MFR may be optimized to fit the fabrication method and specific circumstances as seen fit by those of skill in this art.

The iPPs will generally be largely crystalline and will have a heat of melting above 100 J/g preferably above 120 J/g most preferably above 140 J/g.

The iPPs may have an extractable or solubility level (in xylene as determined by 21 CFR 177.1520 (d) (4) (i)) of below 5%, preferably below 4%, more preferably below 3%, more preferably below 2%, especially for the copolymers. Regardless of the extractable level for the selected iPP components or component, the total extractables level for our inventive blends (determined by the same test above) will not exceed 3%, preferably 2%, more preferably 1.5%, even more preferably 1%, most preferably 0.75%. Commercially available preferable iPPs include specifically the ACHIEVE® polypropylene reins of Exxon Chemical Co. (Houston, Tex.).

Polyethylenes

The polyethylene blend components contemplated in embodiments of our invention are exemplified by metallocene catalyst produced linear low density polyethylene (mLLDPE). Other catalysts are contemplated as long as the CDBI, MWD, extractables, and other physical properties are in the ranges discussed for the mLLDPE, also referred to as mPE in the following description.

Such polyethylenes will be known by those of ordinary skill in the art to have a molecular weight distribution as expressed by weight average molecular weight (Mw) divided by the number average molecular weight (Mn) or Mw/Mn$\leq$20, preferably $\leq$10, more preferably $\leq$4, even more preferably $\leq$3, more preferably $\leq$2.5. The broader molecular weight distribution polyethylenes prepared with mixed catalysts, in series reactors, etc., will suffice if levels of extractable and density ranges are met.

The polyethylenes will have a melt index in the range of from 0.5–100 preferably 0.8–80, more preferably 0.9–50 most preferably 1.0–20 dg/min.

The density of the polyethylene will be in the range of 0.910 to 0.930 g/cm$^3$ preferably 0.912 to 0.925, more preferably 0.915 to 0.920 g/cm$^3$. While higher densities may be used, as high as 0.960 g/cm$^3$, densities in the above range of 0.910 to 0.930 are preferred. At densities below 0.910 g/cm$^3$, polyethylenes generally become softer and softer, and more and more soluble and/or extractable. Both softness and extractability are not desirable properties for blend components of our invention.

The polyethylenes will have a CDBI in the range of 50–95%. Such polyethylenes will generally include ethylene and an α-olefin comonomer. The comonomer can be selected from the group of $C_4$ to $C_{20}$ α-olefins, including, but not limited to butene-1, 4-methyl-1-pentene, hexene-1, heptene-1, octene-1, decene-1 and combinations thereof. Cyclic and vinyl aromatic monomers, as well as isobutylene are also suitable, so long as ethylene crystallinity is sufficient to meet the heat of melting requirements of the invention. Norbornene and styrene are exemplary. Additionally, more than one polyethylene may be combined with one or more iPPs, as long as the overall desired physical properties, extractability and processabiltiy are maintained.

The polyethylene will have a crystallinity greater than that of EPR or EPDM, the EPR and/or EPDM being largely amorphous polymers with a general maximum heat of melting of 30 J/g. The polyethylenes of the presently contemplated include those with a heat of melting in the range of 70–140 J/g preferably 120–140 J/g.

The polyethylene will be present in the blend in the range of 5–40 weight percent, preferably 10–35 weight percent, more preferably 15–35 weight percent, even more preferably 20–35 weight percent, most preferably 25–35 weight percent, based on the total weight of the ingredients of the blend. In general, the amount of polyethylene included in the blends of our invention will be an effective amount to increase the tensile toughness and elongation of iPP/mPE blends over similarly proportioned iPP/Z-N PE blends by the amounts stated herein, while not diminishing the modulus of the iPP/mPE below that of the similarly proportioned iPP/Z-N PE blends. In fact preferred mPE/iPP blends may increase the modulus of the articles made therefrom by at least 5%, preferably at least 7%, while still increasing the tensile toughness by the amounts discussed and maintaining the extractabilities at or below levels discussed herein.

The extractability of metallocene polyethylenes will generally be substantially lower than the extractability of an analogous Ziegler-Natta produced polyethylene. The difference will be most noticeable or most pronounced between an mPE and a gas phase produced Z-N PE, but a large difference will also exist between mPE and a Z-N PE produced in a slurry or solution process. For Z-N, gas phase produced PE the generally accepted level of extractability ( for densities in the range of 0.915–0.925) is at least 5%, while for mPE, in the densities disclosed herein, the extractability will generally be below 1%, preferably below 0.75%, preferably below 0.5%, most preferably below 0.4%, as measured by (xylene) 21 CFR 177.1520 (d) (4) (i).

While describing mPE as the preferred PE, embodiments of our invention may also include blends of polyethylenes. Possible blend constituents include, but are not limited to Z-N PE, and high pressure, free radical produced polyethylene, including low density polyethylene, ethylene copolymers and terpolymers of ethylinically unsaturated carboxylic acids, such as vinyl acetate, methyl acrylate, ethyl acrylate, butyl acrylate, as well as acids such as acrylic acid, methacrylic acid, and combinations of these monomers with ethylene. As long as the physical properties, including tensile toughness and the extractables meet the limits described herein.

It is important to note that any blend constituent used in conjunction with the mPE, in the polyethylene portion of the plastic toughened plastic, should not change the overall desirable properties of the blend such as tensile toughness, modulus, elongation, and extractability outside or above the ranges disclosed herein.

Extractability

Extractability, has relevance in the present application in that we have determined that the primary mode of failure of iPP/Z-N PE blends appears to be that the crystallites of each polymer are not well anchored to one another. The apparent reason for this lack of anchoring is likely disruption of the crystallite anchoring by low molecular weight materials in one or both the iPP and the Z-N PE. The PE generally contributes the major portion of these low molecular weight species. However, no matter which polymer or polymers contribute to the low molecular weight species, we have shown that reducing these low molecular weight species below 3%, preferably below 2%, more preferably below 1%, even more preferably below 0.75%, most preferably below 0.5% (in the blend) will result in a dramatic increase in the tensile toughness of blends made from polymers meeting this extractability limit. A gas phase Z-N PE that has had the majority of the normally produced amorphous materials removed, results in a blend with greatly improved properties compared to the blend where the Z-N PE low molecular weight materials have been left in the PE. However, such low amorphous materials are generally laboratory curiosities, not generally available commercially.

Amorphous materials extractable from polymers and/or polymer blends, may be of either high or low molecular weight. That they are extractable, above the limits for inventive blends outlined herein, they do not form part of embodiments of our invention.

Other Ingredients

Other ingredients in our inventive blends include, but are not limited to, pigments, colorants, antioxidants, antiozonants, antifogs, antistats, fillers such as calcium carbonate, diatomaceous earth, carbon black, combinations thereof, and the like.

Fabrication and Post-Fabrication

Blends of embodiments of the present invention may be fabricated by known conventional techniques. Such techniques include injection molding, blow molding, rotational molding, vacuum forming, thermoforming and the like. Injection molding is preferred.

Properties of Fabricated Articles Based on Blends

Most important of the improvements realized by embodiments of the present invention are improvements in low temperature physical properties. Most of the discussion that follows references −10° C. as the low temperature.

It will be understood by those of ordinary skill that other sub-ambient temperatures can be used. The single, −10° C. temperature is chosen merely to illustrate improvements of embodiments of our invention.

The blends of embodiments of our invention are surprisingly different in physical properties at these sub-ambient temperatures than similarly proportioned blends of iPP and Z-N PE. The tensile toughness at −10° C. of the present blends will be at least 25%, preferably at least 100%, more preferably at least 200%, most preferably at least 250% greater than the tensile toughness of similarly proportioned blends of iPP with Ziegler-Natta catalyst produced polyethylene.

Likewise, the elongation at −10° C. of the inventive blends will be at least 10%, preferably 20%, more preferably 30%, most preferably 40% greater than the elongation of a Ziegler-Natta catalyst produced polyethylenes blended with iPP.

Additionally, the blends according to the invention exhibit commensurate improvements in impact toughness (as measured by standard Charpy impact tests) as compared to similar prior art blends of polyethylene and propylene.

These properties are unexpected not only because of their magnitude but because previous blends that improved tensile toughness dramatically lowered the modulus of the blends, however our inventive blends do not substantially lower the modulus of iPP. Additionally the above referenced dramatic improvements in tensile toughness and elongation over iPP/Z-N PE similarly proportioned blends are notable in that they do not come at the cost of modulus. The mPE/iPP blends of embodiments of our invention will have equal or higher modulus as the iPP/Z-N PE blends, equal or 5%, preferably 7% greater. It is the dramatically higher tensile toughness, while maintaining this substantially the same modulus, that is the most unexpected property of embodiments of our invention.

| Definitions and Testing Protocols | |
|---|---|
| Tensile: | ASTM D638 Type V (tensile toughness is the area under the curve of the stress-strain plot) |
| Melt Flow Rate (MFR): | ASTM D 1238, condition L |
| Melt Index (MI): | ASTM D 1238, condition E |
| DMTA: | Dynamic mechanical thermal analysis |
| DSC: | Differential Scanning Calorimetry |
| TEM: | Transmission Electron Microscopy |
| SAXS: | Small Angle X-ray Scattering |
| CDBI: | Composition Distribution Breadth Index |
| Modulus: | ASTM D 368 (as measured herein on a rheometer with a dual cantilever, see DMTA above) |
| Elongation: | ASTM D 368 |
| Extractability: | xylene 21 CFR 177.1520 (d) (4) (i) |

TABLE 1

Molecular Characteristics of Polymers

| Polymer | $M_n \times 10^3$ | $M_n/M_w$ |
|---|---|---|
| PP4062 | 57 | 2.4 |
| Exceed ™ | 50 | 2.3 |
| LL3003 | 50 | 5.5 |
| EXE65 | 65 | 1.04 |

Experimental
Materials

Selected physical properties for the polymers used in this study are given in Table 1. Escorene PP4062, Exceed™ 350D60 (an mPE, heat of melting 124 J/g (second melt, 10° C./minute)) and LL3003 (a Z-N PE heat of melting 140–150 J/g) (all are commercially available from the Exxon Chemical Company, Houston, Tex.). PP4062 is a film grade isotactic polypropylene with a melt flow rate of 3.6 g/10 min and a density of 0.9 g/cm³. Both Exceed™ and LL3003 are ethylene-hexene copolymers. The Exceed™ polyethylene has a melt index of 1 g/10 min. and a density of 0.917 g/cm³, while the LL3003 polyethylene has a melt index of 3 g/10 min. and a density of 0.918 g/cm³. The PP4062 and the LL3003 are manufactured with Ziegler-Natta catalyst while the Exceed™ is produced with metallocene single site catalyst. The amorphous content and/or extractables content of Ziegler-Natta PE differs from that of the metallocene PE as described above. As determined by 21 CFR 177.1520 (d) (4) (i) (in xylene), LL3003 contains 5.5% amorphous material while Exceed™ contains only 0.5%. This amorphous material has a weight average molecular weight (mw)≈10K g/mole and a polydispersity of 2. The composition breadth index for Exceed™ is 64% while that for LL3003 is 25%. As the composition breadth approaches 100%, the co-monomer content of the chain is statistically random, thus LL3003 has a much higher content of hexene monomer in the low molecular weight amorphous material than does Exceed™.

A triblock copolymer EXE65 is used in some of the evaluations. This triblock contains PE end segments and an iPP miscible center segment, PX. PX is a random copolymer of ethylene and in a composition ratio shown to be miscible with iPP. The introduction of a block copolymer at the interface of the metallocene blend allows the effect of chain length to be decoupled from that of interfacial crystallinity, resulting in the deduction of a microscopic failure mechanism for PE/iPP blends at −10C. The triblock copolymer, EXE65, was prepared by hydrogenating an anionically polymerized poly(butadiene) precursor. Chains having 93% 1,4 addition and 7% 1,2 addition were sequentially polymerized with chains containing 88% 1,2 addition and 12% 1,4 addition, creating a living diblock copolymer that was coupled with dichlorodimethylsilane. Subsequently, the chains were hydrogenated, producing a 65,000 g/mol triblock that was 35 vol. % polyethylene (f=0.35). Details of the anionic synthesis techniques are described in detail in Weimann, P. A., Jones, T. D., Hillmyer, M. A., Bates, F. S., Marcomolecules 1997 30, 3650.

Blend Preparation

All blends were prepared by melt mixing the constituents in a Haake Rheomix 600. Roller blade attachments were driven by a Haake System 90 torque rheometer. The mixer was run at 50 RPM, corresponding to a maximum shear rate of 65s⁻¹. Blends were mixed for 5 minutes at 190° C. Constituents were stabilized with 0.1 wt. % BHT (2,6-di-tert-butyl- 4-methyl-phenol) to scavenge any free radicals created upon heating. Upon removal from the mixer, the molten polymer was quenched in liquid nitrogen. All blend compositions were held constant at 30 wt. % PE. Tensile Properties: ASTM D638 Type V tensile specimens were prepared in a small capacity Morgan Injection Molding Machine. The Haake blend was loaded into a 220° C. barrel and injected into a 50° C. mold. The molder was operated with an injection pressure of 7,500 psi and a clamp force of 13 tons. The cycle time was 1 minute for all blends. Tensile bars were aged at ambient conditions for at least 14 days prior to testing. Samples were pulled to failure with an MTS 810 servo-hydraulic testing system equipped with an environmental chamber. Samples were equilibrated at −10° C. for 30 minutes before testing at a rate of 50 millimeters per minute. The yield strength, the percent elongation at break, and the tensile toughness (the integrated area of the stress-strain curve) are extracted from the tensile data. Reported data are an average of at least four tensile experiments.

Dynamic Mechanical Thermal Analysis (DMTA)

The solid state linear viscoelastic properties were measured using a Rheometrics Solids Analyzer equipped with a dual cantilever test fixture. The specimen was subjected to an oscillatory deformation at 0.1% strain and a frequency of 1 radian per second. The elastic modulus was calculated from the in-phase material response measured at −10° C. Differential Scanning Calorimetry (DSC): A Perkin Elmer DSC-7 was used for calorimetric studies. Material from the gage length of the tensile bar was heated from room temperature to 200° C. at a rate of 40° C./min. The melting temperature was taken as the temperature corresponding to the peak in heat flow during heating. Enthalpies of crystallization and melting were obtained by integrating the heat flow curve to a flat baseline. Using the heat of melting of a perfect iPP (165 J/g) and a perfect PE (277 J/g) crystal, the weight fraction crystallinity was calculated as, $$Wc = \frac{\Delta H_{melt}}{f \Delta H_{melt}^{ideal}}$$

where $\Delta H_{melt}$ is the measured enthalpy of melting, $\Delta_{melt}^{ideal}$ is the ideal enthalpy of melting a perfect crystal of polymer X, and f is the weight fraction of polymer X in the blend.

Transmission Electron Microscopy (TEM)

A JEOL 1210 transmission electron microscope, operated at 120 KeV, was used to characterize the blend morphologies. The samples were cryo-microtomed to a flat face at −70° C. and stained with ruthenium tetroxide vapor for 3 to 8 hours depending on blend crystallinity. Amorphous regions were stained preferentially to crystalline regions with the PE phase adsorbing more stain than the iPP phase, thus appearing darker in the TEM images. Failed specimens were encapsulated in epoxy prior to cutting and staining, preserving any voiding in the structure.

Image Analysis: TEM images were analyzed using Ultimage® software. For coalescence analysis, a spherical dispersion morphology was assumed. The particle diameter was found by dividing the particle area by π, taking the square root and multiplying by two. Because microtoming slices the spherical dispersion randomly, the Observed particle diameter must be corrected to reflect the true diameter; the diameter obtained by image analysis if all the slices went through the center of the spherically shaped dispersion. Assuming the particles are randomly distributed spheres of equal size, the average of the true particle diameter, $d_t$, can be calculated from the average of the observed particle diameter, $d_o$ as $$d_t = \frac{4}{\pi} d_o$$

To quantify the anisotropic nature of the injection molded parts, the aspect ratio was calculated. Reported values are number averages of not less than 150 particles. Consequently, statistics were gathered from multiple TEM images, sampling different spots of the blend morphology. Small Angle X-ray Scattering (SAXS): The University of Minnesota SAXS instrument was used to investigate the microstructure of both the unstrained and strained tensile bars.

The exterior skin is trimmed off the gage section of the tensile bar and the trimmed bars mounted such that the beam direction was perpendicular to the molded flow direction. Measurements were taken at a 225 cm sample-to-detector distance using $CuK_\alpha$ radiation ($\lambda=1.542$ Å). The scattering patterns were collected on a two dimensional multi-wire detector and corrected for background and detector response characteristics. Due to the small density variations between the polyolefins being studied long exposure times—twelve hours—were required. The images presented are plotted on a logarithmic intensity scale.

perpendicular to the flow direction shows the average Exceed diameter is 0.31±0.01 μm while that of LL3003 is 0.25±0.02 μm. The molten polymer was gated in the grip section of the bar, resulting in converging flow through both the gate and the gage section. This extensional flow elongates the PE dispersed phase, producing a dispersion having an aspect ratio of 12±6 for the Exceed™/PP4062 blend and 12±5 for the LL3003/PP4062 blend. No morphology change was observed upon comparing the first tensile bar with the last tensile bar molded.

Following equilibration at −10° C. for thirty minutes, tensile bars were pulled to failure. Typical stress-strain data are plotted in FIG. 1. PP4062 polypropylene fails after minimal elongation, $\epsilon=0.35\pm0.04$ ($\epsilon*100$=elongation %. Exceed™ polyethylene yields, then strain hardens before failing at 680±12% elongation. The blend of 30% Exceed™ and 70% PP4062 yields and begins to strain harden; this is accompanied by stress whitening of the entire gage section. Upon further extension, the skin formed at the injection mold surface fails in the necked portion of the bar ($\epsilon=4$) resulting in a reduction of the cross-sectional area and an abrupt drop in engineering stress. Given the ability to measure the instantaneous change in cross sectional area during testing, the true stress-strain curve could be calculated. Such a curve would show no drop in stress prior to failure at 1190±130% elongation as the reduction in cross-sectional area is accounted for in the true stress calculation.

Figure 2:
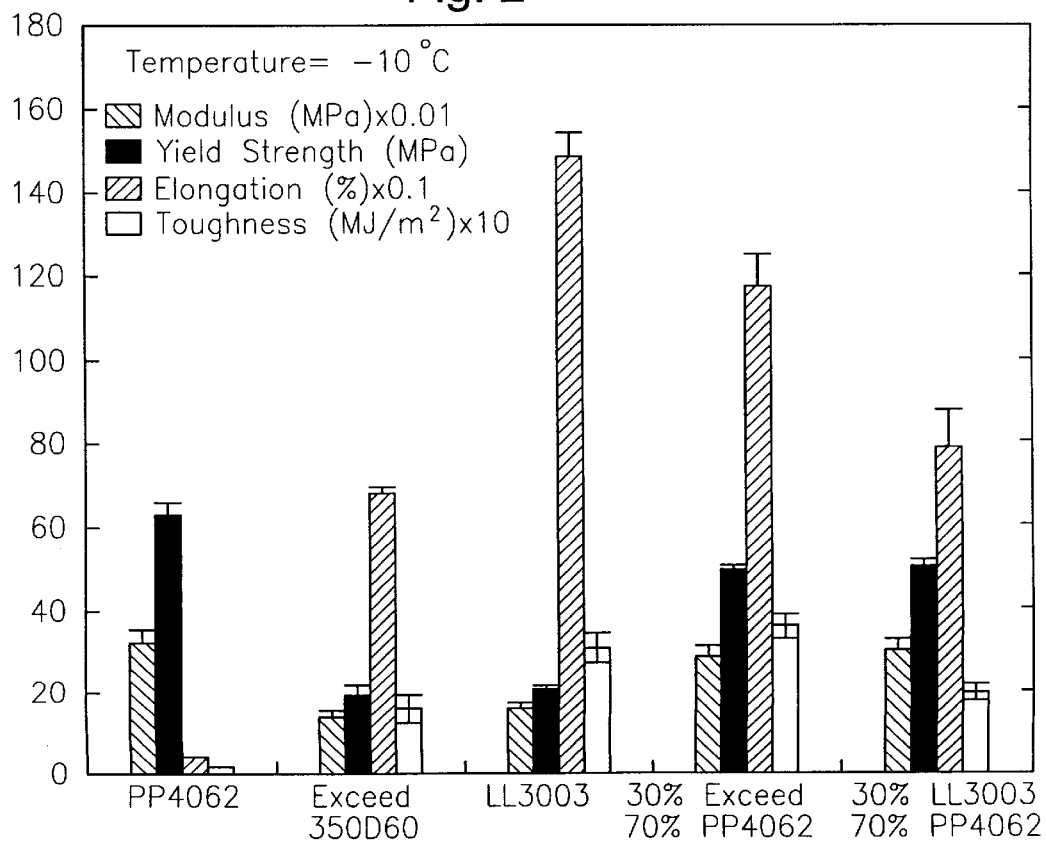
FIG. 2 is a bar graph depicting modulus, yield strength, elongation and toughness for various components and blends of the components.

The modulus, yield strength, percent elongation, and toughness for the materials studied are summarized in FIG. 2 (table 1). The modulus and yield stress for both PE/iPP blends are comparable to those anticipated by the rule of mixtures. The elongation and toughness responses of the blend composed of Ziegler-Natta PE are distinctively different than those of the blend with metallocene PE. The 30% LL3003/70% PP4062 blend has an elongation (790±150%) and toughness (1.9±0.2 MJ/m2) intermediate to that of the blend constituents. In contrast, the Exceed™/PP4062 blend has an elongation (1190±130%) and a toughness (3.6±0.1 MJ/m2) which are 175% and 233% greater, respectively,

TABLE 2

Tensile Experiments

| Sample | Elongation (%) | Modulus (MPa) | Yield Strength (MPa) | Integrated Area (MPa) |
|---|---|---|---|---|
| Tensile Experiments Performed at −10° C. | | | | |
| PP4062 (iPP) | 35 (± 5) | 3250 (± 325) | 64 (± 1) | 15 (± 3) |
| LL3003 (zPE) | 305 (± 15) | 926 (± 92) | 20 (± 1) | 397 (± 6) |
| Exceed ™ (mPE) | 680 (± 12) | 1440 (± 140) | 19 (± 2) | 200 (± 45) |
| Exact ™ 3025 | 923 (± 19) | 930 (± 93) | 15 (± 1) | 225 (± 20) |
| 30% zPE/70% iPP | 790 (± 15) | 2818 (± 281) | 50 (± 2) | 253 (± 28) |
| 30% mPE/70% iPP | 1190 (± 14) | 2927 (± 293) | 49 (± 1) | 467 (± 9) |
| 30% Exact ™ /70% iPP | 1060 (± 41) | 2870 (± 280) | 48 (± 1) | 352 (± 62) |
| Tensile Experiments Performed at Room Temperature | | | | |
| PP4062 (iPP) | 1150 (± 200) | 1600 (± 160) | 42 (± 2) | 217 (± 21) |
| LL3003 (zPE) | >1600 (No Break) | 543 (± 54) | 11 (± 1) | <235 (No Break) |
| Exceed ™ (mPE) | 978 (± 78) | 786 (± 79) | 11 (± 1) | 211 (± 30) |
| Exact ™ 3025 | 1185 (± 98) | 389 (± 40) | 8.5 (± 0.8) | 194 (± 71) |
| 30% zPE/70% iPP | 1178 (± 70) | 1591 (± 159) | 34 (± 1) | 315 (± 36) |
| 30% mPE/70% iPP | 1447 (± 60) | 1635 (± 163) | 33 (± 1) | 440 (± 41) |
| 30% Exact ™ /70% iPP | 1341 (± 101) | 1528 (± 150) | 32 (± 1) | 365 (± 23) |

Results and Analysis

The morphology in the gage section of a tensile bar composed of 30% Exceed™/70% PP4062 is reviewed by reference to a TEM of the section. TEM on a sample cut than the elongation and toughness of the most ductile constituent, Exceed™, at −10° C. By contrast, the same calculation for Z-N PE/iPP blends shows that elongation is 150% of and toughness is 36% of the most ductile component, the Z-N PE, LL3003. The elongation of the iPP/Exceed™ blend is 50% greater than the iPP/Z-N PE blend. The toughness of the iPP/Exceed™ blend is 89% greater than the iPP/Z-N PE blend toughness.

The large difference in elongation and toughness properties between the metallocene and Ziegler-Natta blends is explored and the interfacial characteristics as well. TEM micrograph analysis of the 30% Exceed™ blend (a) and the 30% LL3003 blend (b) with PP4062 shows two distinct differences. Firstly, the PP4062 crystalline lamellae in the metallocene blend are well ordered, perpendicular to the flow direction, spanning the space (≈500 nm) between the PE domains. Although some degree of lamellae alignment exists in the LL3003 blend, it does not extend in excess of 150 nm. Secondly, a thin dark band (≈10 nm) encapsulates the dispersed PE domains in the blend containing Ziegler-Natta PE. Dark areas are a result of heavier staining, indicative of amorphous material at the LL3003/PP4062 interface.

Small angle X-ray experiments on the unstrained tensile bars provide reciprocal space imaging of the blend structure at length scales ranging from 100–600 Å. Reciprocal space images reveal differences in crystalline lamellae orientation. The characteristic lamellar spacing of iPP is different than that of PE, allowing the two types of crystalline structures to be distinguished. 2D SAXS patterns of both the Exceed™/PP4062 and the LL3003/PP4062 unstrained tensile bars, (a) and (b) respectively are reviewed. The tensile bar orientation with respect to the images is consistent with that in the TEM discussed above, where the x-ray beam direction is along the same axis (i.e. perpendicular to the flow direction in the mold). In both blends, the PP4062 lamella align perpendicular to the flow direction, resulting in symmetric lobes of scattered intensity along the horizontal axis of the beam stop. These lobes are centered at a domain spacing corresponding to ≈155 Å, the same domain spacing obtained for 100% PP4062. A comparison of the intensity breadths and positions indicates no significant difference between the domain spacing or relative orientation of the iPP crystallites in the two blends. The SAXS images of the Exceed™/PP4062 and the LL3003/PP4062 blends are distinguished from one another by the orientation of the PE lamella. The Exceed™ blend exhibits four-fold symmetry centered at ±50° and ±30° from horizontal axis at a domain spacing of ≈250 Å, the same spacing obtained for 100% Exceed™. This scattered intensity forms circular shaped spots on the 2D image spanning a width of ±15° with respect to the reflection center and a distance of ±50 Å with respect to the domain spacing. This symmetry and shape indicate that the Exceed™ lamella are regularly oriented at angles of 50°±15° from the flow direction, while the distribution of lamellar thickness ranges from 200 Å to 300 Å.

The LL3003 blend has very different lamella orientation. Four fold symmetry is located at ±55° and ±125° from horizontal. Reflections also appear along the vertical axis. Rather than circular in nature, the PE reflections appear as streaks having a width of ±2° and spanning out from the beam stop to a maximum domain spacing of ≈250 ÅA for the off axis reflections and ≈200 Å for the vertical reflections. The shape of the PE scattering is a consequence of the large polydispersity of the LL3003, as PE chains of differing molecular weights are known to fractionate upon crystallization resulting in a wide range of lamella thickness.

Insight into the failure mechanism is gained with TEM imaging. Micrographs are taken and analyzed near the point of failure in the Exceed™/IPP4062 and the LL3003/PP4062 blends respectively, where the view is along the same direction as the TEM discussed above.

The observed point of failure of the different blends is instructive. In the Exceed™ blend, the PE/iPP interface is strongly coupled, resulting in no interfacial failure. As the interface flows with the deformation of the PE phase, the iPP phase begins to fail in the interior of the domain, forming craze fibrils perpendicular to the macroscopic strain direction. The cross-hatched nature of the PE phase is indicative of shear banding, a consequence of good mechanical stress transfer across the interface. Imaging of the LL3003 blend shows some crazing within the iPP matrix, however the predominate failure mode is interfacial. Indicative of high contents of amorphous material, areas that peel apart also stain heavily. Cross hatching in the PE phase does not dominate as with the Exceed™ blend, indicating limited stress transfer through the interface, from the matrix to the dispersed phase.

Figure 3:
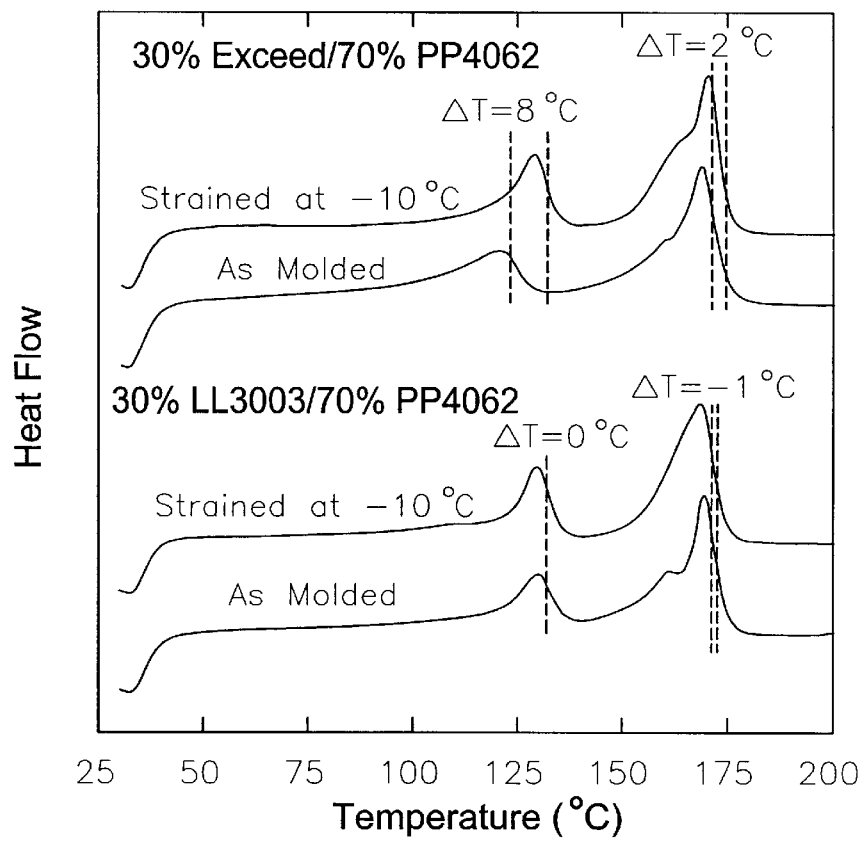
FIG. 3 are DSC traces of tensile bars before and after straining at $-10°$ C.

DSC heating traces of tensile bars before and after straining at −10° C. are compared in FIG. 3. Straining the Exceed™ blend results in an 8° C. increase in the peak melting temperature for the PE crystallites over that observed in the unstrained, as molded, material. The increase, indicative of lamellar thickening, is accompanied by a narrowing of the melting transition and an increase in crystallinity from 27% to 33%. The bi-modal melting peak of the PP4062 changes in shape and the crystallinity increases from 46% to 52%. Straining the LL3003 blend does not significantly change the peak melting temperature of the LL3003 crystallites. However, the PE transition narrows while the peaks of the bi-modal iPP transition superimpose, appearing as a broad single peak in the strained sample. Both components experience an increase in crystallinity upon straining at −10° C., increasing from 23% to 36% for LL3003 and from 43% to 51% for PP4062.

Block Copolymer/PE,iPP Blends

The thermodynamic instability (upon long term storage at or near the melting point)of the Exceed™/PP4062 blend similar to most immiscible blends, is analyzed in view of micrograph taken from material removed from the mixer and immediately quenched in liquid nitrogen. The solid iPP matrix can support a sub-micron PE dispersion, produced through mechanical melt mixing followed by rapid crystallization. However, such a morphology is thermodynamically unstable to further melt state processing. After annealing at 220° C. for one hour, the characteristic PE diameter increases from 0.66±0.18 $\mu$m to more than 2.5 $\mu$m in the Exceed™/PP4062 blend. Addition of the EXE65 block copolymer stabilizes the immiscible blend. Upon removal from the Haake, the stabilized dispersion is slightly elongated due to the flow field in the mixer. Annealing the blend relaxes the stress and the dispersion takes on a thermodynamically favorable spherical shape, minimizing surface area. A review of the mirographs shows that the characteristic diameter of the block copolymer stabilized dispersion remains essentially constant at 1.5±0.5 $\mu$m.

Figure 4:
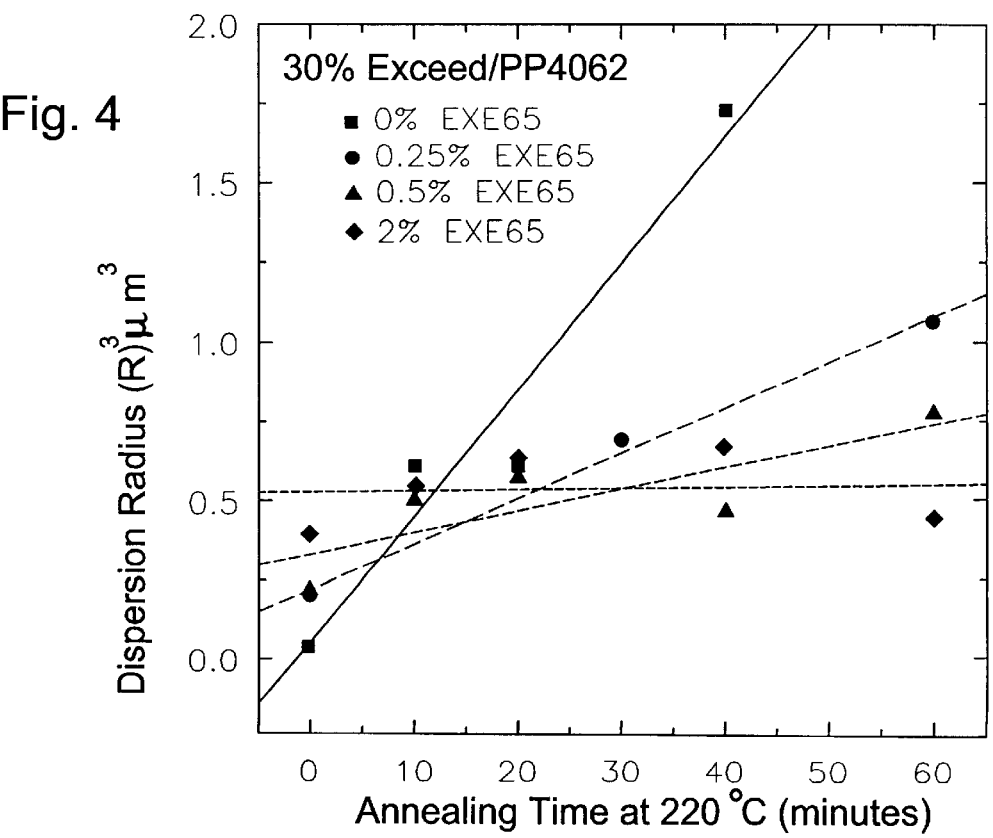
FIG. 4 is a plot of dispersion diameter as a function of annealing time at $220°$ C.

Very little block copolymer is required for melt stabilization of the Exceed™/PP4062 blend. FIG. 4 is a plot of dispersion diameter as a function of annealing time at 220° C. The unstabilized blend is compared with blends containing 0.25%, 0.5%, and 2% EXE6S. An indication of blend stabilization is obtained by plotting the data according to the Ostwald Ripening Model $$R3(t)R3(t=0)+kt \tag{3}$$

where R is the average dispersion radius, t is the time of static coalescence, and k is the rate constant of coarsening. The blend containing 0% block copolymer coarsens significantly and is described by a rate constant k≈0.04±0.007 min$^{-1}$. As the content of block copolymer is increased, the rate of coalescence decreases. At 0.25% EXE65 the rate of coarsening is slightly arrested reducing the rate constant 35%, k≈0.014±0.0009 min$^{-1}$. With a block copolymer loading of 0.5%, coalescence is slow, resulting in a rate constant that is an order of magnitude below that of the unstabilized case, ≈0.0067±0.002 min⁻¹. At 2% EXE65 the rate constant of coalescence is reduced 2 orders of magnitude from that of the unstabilized case (k≈0.004±0.0002 min⁻¹), essentially arresting all coarsening. The block copolymer changes the viscosity ratio, thereby increasing the initial dispersion size from that of the unstabilized blend. This initial increase in dispersion size is insignificant compared to that change experienced by the unstabilized blend undergoing coalescence.

The morphology in the gage section of an injection molded tensile bar composed of 2% EXE65/30% Exceed™/68% PP4042 is reviewed. The aspect ratio of the dispersion is 8.7±3 μm, while the characteristic dimension along direction (A) in FIG. 1 is 0.19±0.02 μm. The well ordered iPP crystalline lamellae structure seen in the non-stabilized Exceed™ blend is absent. At high magnifications, the block copolymer is observed as a dark thin band, ≈10 nm wide, at the Exceed™/PP4062 interface.

Addition of 2% block copolymer changes the small-angle scattering picture. Although not resolved in a TEM, the reciprocal space image indicates some degree of iPP lamella alignment perpendicular to the flow direction. As in the non stabilized blends, these lobes of scattering intensity are positioned along the horizontal axis and have a characteristic domain spacing of 155 Å. The ratio of the scattering peak breadth to the scattering height for the azimuthally averaged intensity peak centered at q=155 Å⁻¹ is a measure of the degree of iPP alignment. A comparison of this ratio for the 2% EXE65 blend with the non stabilized blends shows a ten fold decrease in the alignment of PP4062 in the 2% EXE26 blend. In addition to the decrease in orientational ordering of the iPP, the introduction of EXE65 erases all orientational ordering of the Exceed™ lamellae, resulting in a halo of scattering intensity at a length scale of 250 Å.

TEM on the failed Exceed™ IPP4062 blend containing 2% EXE65 reveal a combination of interfacial failure and crazing failure of the iPP matrix. Interfacial failure occurs at locations having a high concentrations of block copolymer, while crazing occurs in areas void of the dark interfacial bands, as indicated in the figure.

Figure 5:
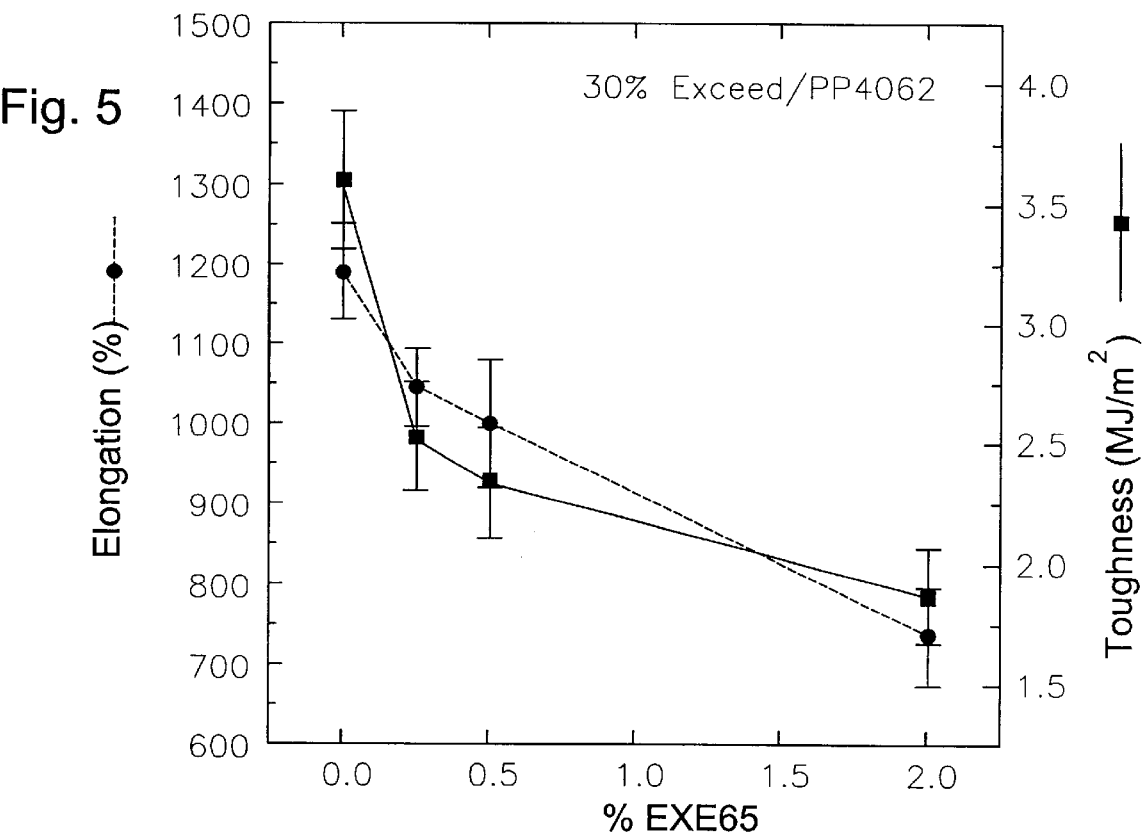
FIG. 5 is a plot of toughness and elongation versus % block copolymer inclusion.

Tensile properties for the stabilized blends are shown in FIG. 5. Addition of block copolymer to the blend does not effect the yield strength or modulus for the concentrations considered herein. However, as the content of block copolymer is increased, the elongation and toughness are reduced. At 2% EXE6S loading, the elongation and toughness of the Exceed™ blend are comparable to that of the unstabilized LL3003 blend, a 40% reduction in toughness from that of the unstabilized Exceed™/PP4062 blend.

Figure 6:
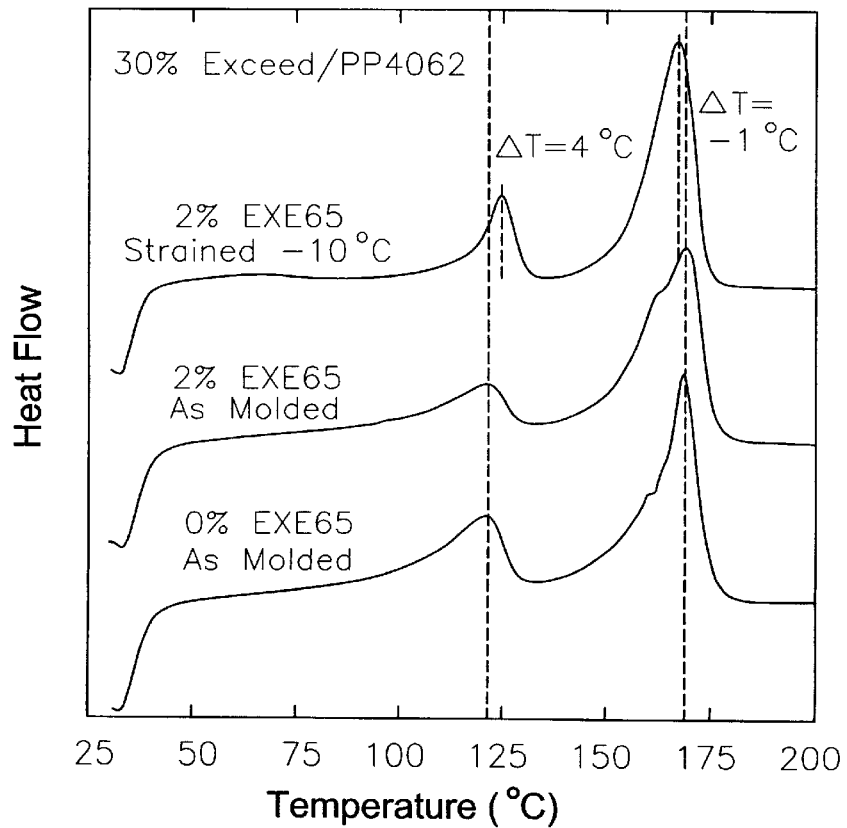
FIG. 6 are DSC traces for failed tensile bars (including the block copolymer) compared to the unstrained tensile bar.

DSC heating traces for the failed tensile bars composed of XE65/Exceed™/PP4062 are compared with those of unstrained samples in FIG. 6. The addition of block copolymer to PE/iPP results in a different initial DSC profile for the iPP crystallites, changing the distribution of the bi-modal melting curve in the unstrained samples. Straining the stabilized blend increases the peak melting temperature of the Exceed™ crystallites by 40° C., half as much as for the strained, unstabilized blend. The bi-modal shaped melting distribution of the iPP crystals disappears upon straining, similar to the PP4062 response in the LL3003 blend. Upon deformation, the degree of crystallinity in both crystalline phases is increased, from 18% to 22% for PE and from 51% to 59% for iPP.

Although the present invention has been described in considerable detail with reference to certain preferred embodiments thereof, other embodiments are possible. For example, while iPP/mPE blends are exemplified at 70/30 wt %, other blend ratios are contemplated. Therefore, the spirit and scope of the appended claims should not be limited to the description of the preferred embodiments contained herein.

What is claimed is:

1. A plastic toughened plastic blend having excellent tensile toughness at −10° C., comprising:
  (a) 65–75 weight percent of iPP; and
  (b) 25–35 weight percent of a metallocene catalyst produced polyethylene (mPE), said mPE having a CDBI in the range of 55–90%, a Mw/Mn≦10, a melt index (MI) in the range of 1–30 dg/min;
  wherein the total extractables of said blend is less than 1% as determined by (xylene) 21 CFR 177.1520 (d) (4) (i);
  wherein an article fabricated from said plastic toughened plastic blend has a tensile toughness at −10° C. at least 250% greater than that of a Ziegler-Natta catalyzed polyethylene (Z-N PE) iPP blend of substantially the same proportions as the mPE/iPP blend, and elongation at −10° C. at least 40% greater than said iPP/Z-N PE blend, and
  wherein the modulus, as measured by ASTM D 368, of the mPE blend is equal to or greater than the modulus of said Z-N PE/iPP blend at −10° C.

2. The plastic toughened plastic of claim 1, wherein said iPP has a heat of melting above 140 J/g, and wherein said mPE has a heat of melting in the range of 120–140 J/g.

3. An automotive interior trim part including the plastic toughened plastic blend of claim 2.

4. The automotive interior trim part of claim 3, wherein said part is an "A" pillar.

5. An automotive interior trim part including a plastic toughened plastic, said part having excellent tensile toughness and elongation at −10° C., comprising;
  (a) an isotactic polypropylene (iPP) having a heat of melting of at least 100 J/g, said iPP being present in said plastic toughened plastic in the range of 60–95 weight percent, based on the total weight of said plastic toughened plastic; and
  (b) a metallocene catalyst produced polyethylene (mPE) present in said plastic toughened plastic in the range of 5–40 weight percent, based on the total weight of said plastic toughened plastic, said mPE having a CDBI in the range of from 55–90%, a Mw/Mn≦5, a MI in the range of 5–15 dg/min, and a heat of melting in the range of from 70–140 J/g,;
  such that the plastic toughened plastic, after melt processing and fabrication into said part, has a tensile toughness at −10° C. at least 100% greater than a similarly proportioned blend of Ziegler-Natta catalyst produced polyethylene, and iPP, wherein said plastic toughened plastic has a an extractables level below 3%, as determined by (xylene) 21 CFR 177.1520 (d) (4) (i), and where a modulus of said plastic toughened plastic, as determined by ASTM D 368, is at least 5% greater than the similarly proportioned blend of iPP and Z-N PE.

6. The automotive interior trim part of claim 5 wherein said iPP has a heat of melting above 120 J/g, wherein said mPE has a heat of melting in the range of 120–140 J/g, and wherein said plastic toughened plastic has a an extractables level below 2%, and wherein said plastic toughened plastic has a tensile toughness at −10° C. at least 200% greater than a similarly proportioned blend of Ziegler-Natta catalyst produced polyethylene.

7. The automotive interior trim part of claim 6, wherein said plastic toughened plastic has a an extractables level below 2%, and wherein said plastic toughened plastic has a tensile toughness at −10° C. at least 250% greater than a similarly proportioned blend of Ziegler-Natta catalyst produced polyethylene.

8. An automotive interior trim part including a plastic toughened plastic, said part having excellent tensile toughness and elongation at −10° C., comprising;

(a) an isotactic polypropylene (iPP) having a MFR in the range of 1–200 dg/min, and a heat of melting of at least 100 J/g; and (b) an effective amount of a metallocene catalyst produced polyethylene (mPE) to raise the tensile toughness of the plastic toughened plastic interior trim part at least 200% above the tensile toughness of a similarly proportioned iPP/Z-N PE blend, said mPE being present in an effective amount to additionally maintain the level of extractables of the interior trim part below 0.75% as determined by (xylene) 21 CFR 177.1520 (d) (4) (i), said mPE having a CDBI in the range of 55–90%, a Mw/Mn≦5 a MI in the range of 5–15 dg/min, and a heat of melting in the range of from 70–140 J/g.

9. The automotive interior trim part of claim 8 wherein said iPP has a heat of melting above 120 J/g, wherein said mPE has a heat of melting in the range of from 120–140 J/g, and wherein said tensile toughness of the plastic toughened plastic interior trim part at least 250% above the tensile toughness of a similarly proportioned iPP/Z-N PE blend.

10. A plastic toughened plastic blend having excellent tensile toughness at −10° C., comprising:

(a) 60–95 wt. of iPP; and (b) 5–40 wt. of a polyethylene said polyethylene having a CDBI in the range of 55–90%, a Mw/Mn≦10, a melt index (MI) in the range of 1–30 dg/min;

wherein the total extractables of said blend is less than 1% as determined by (xylene) 21 CFR 177.1520 (d) (4) (i);

wherein an article fabricated from said plastic toughened plastic blend has a tensile toughness at −10° C. at least 100% greater than that of a Ziegler-Natta catalyzed polyethylene (Z-N PE) iPP blend of substantially the same proportions as the polyethylene PE/iPP blend, and an elongation at −10° C. at least 40% greater than said iPP/Z-N PE blend, and wherein the modulus at −10° C., as measured by as determined by ASTM D 368 of the blend is at least 5% greater than the modulus at −10° C. of said Z-N PE/iPP blend.

11. The plastic toughened plastic of claim 10 wherein said iPP is present in said, blend from 65–90 wt., said polyethylene PE is present in said blend from 10–35 weight percent; wherein an article fabricated from said plastic toughened plastic blend has a tensile toughness, at −10° C. at least 200% greater than that of a Ziegler-Natta catalyst polyethylene/iPP blend of the same proportions as a mPE/iPP blend, wherein the total extractables of said blend is less than 0.75% as determined by (xylene) 21 CFR 177.1520 (d) (4) (i); wherein said iPP has a heat of melting above 120 J/g, and wherein said mPE has a heat of melting in the range of from 120–140 J/g.

12. The plastic toughened plastic of claim 10 wherein said iPP is present in said, blend from 65–85 weight percent, said polyethylene PE is present in said blend from 15–35 weight percent;

wherein an article fabricated from said plastic toughened plastic blend has a tensile toughness, at −10° C. at least 250% greater than that of a Ziegler-Natta catalyst polyethylene/iPP blend of the same proportions as a mPE/iPP blend; wherein the total extractables of said blend is less than 0.5% as determined by (xylene) 21 CFR 177.1520 (d) (4) (i); wherein said iPP has a heat of melting above 140 J/g, and wherein said mPE has a heat of melting in the range of from 120–140 J/g.

* * * * *